Nov. 11, 1958    F. E. BIRTCH ET AL    2,859,665
APPARATUS FOR RELIEVING PORTIONS OF THE THREAD
FLANKS OF DOUBLE ENVELOPING WORM ELEMENTS
Filed Dec. 21, 1956    3 Sheets-Sheet 3
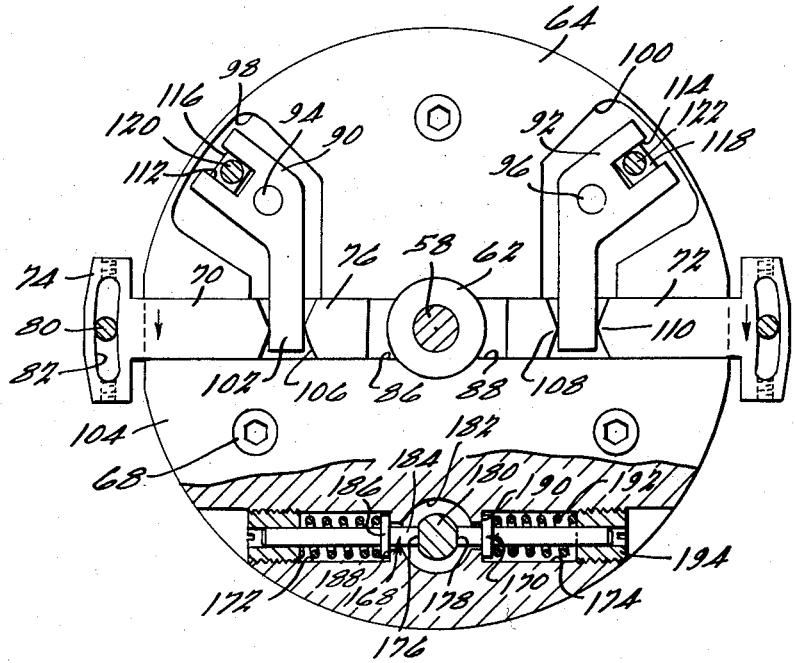
FIG. 4.
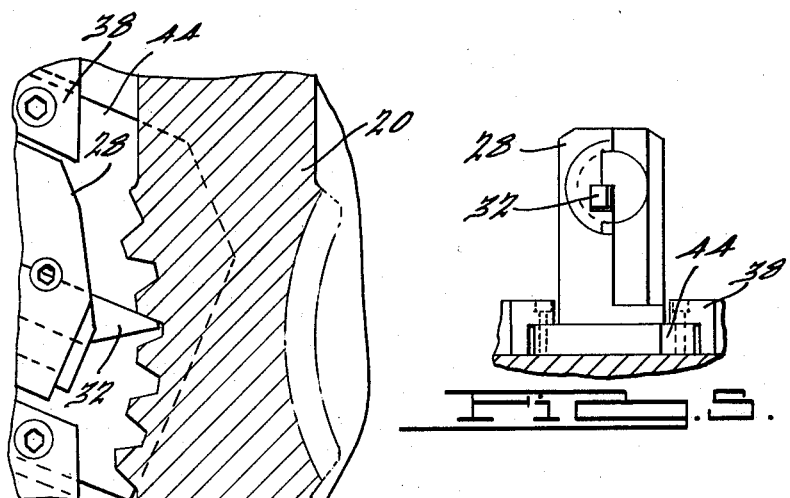
FIG. 5.
FIG. 6.
INVENTORS.
Fred E. Birtch
Bernard H. Johnson
BY
Harness, Dickey & Pierce
ATTORNEYS.

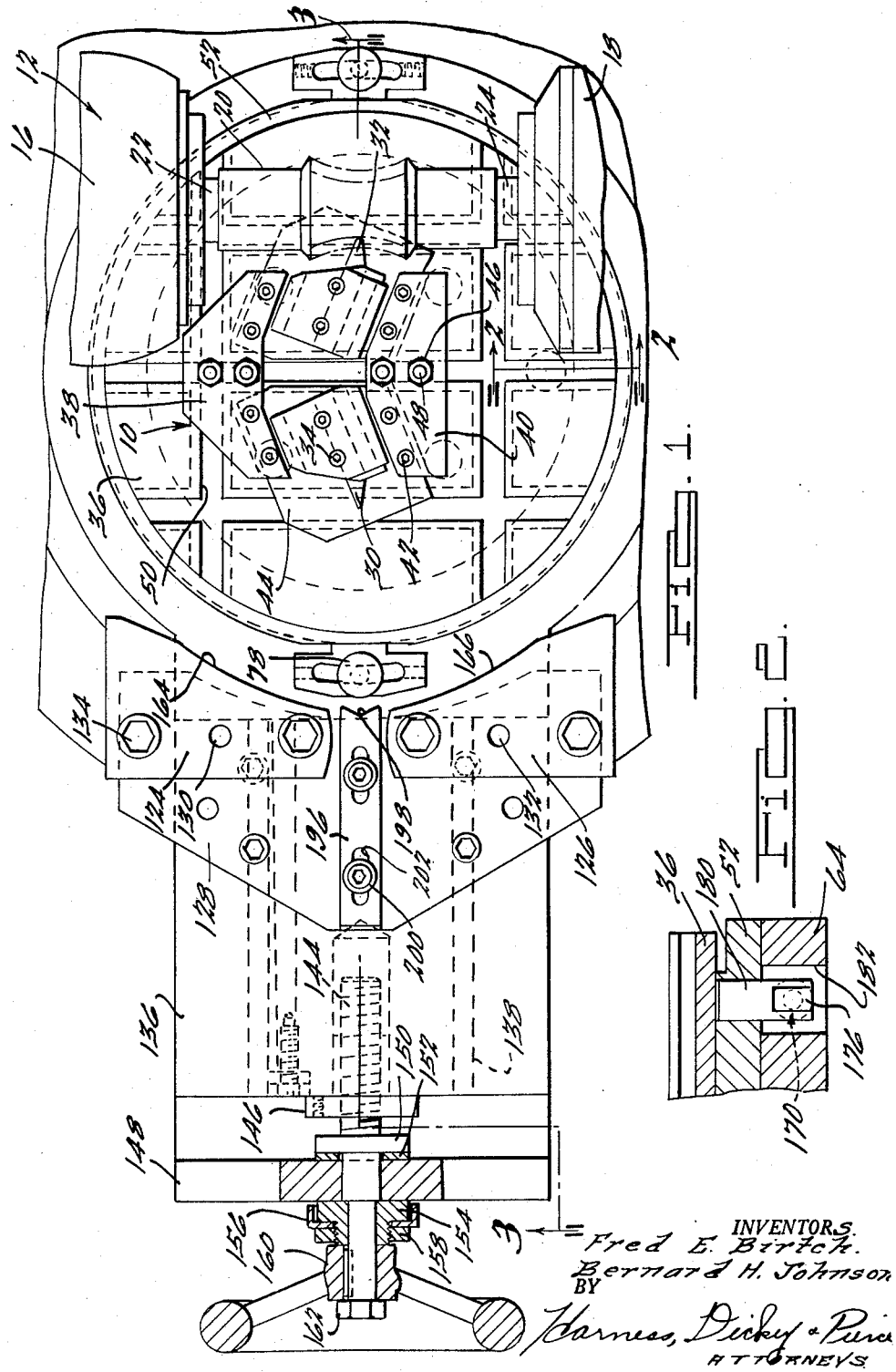

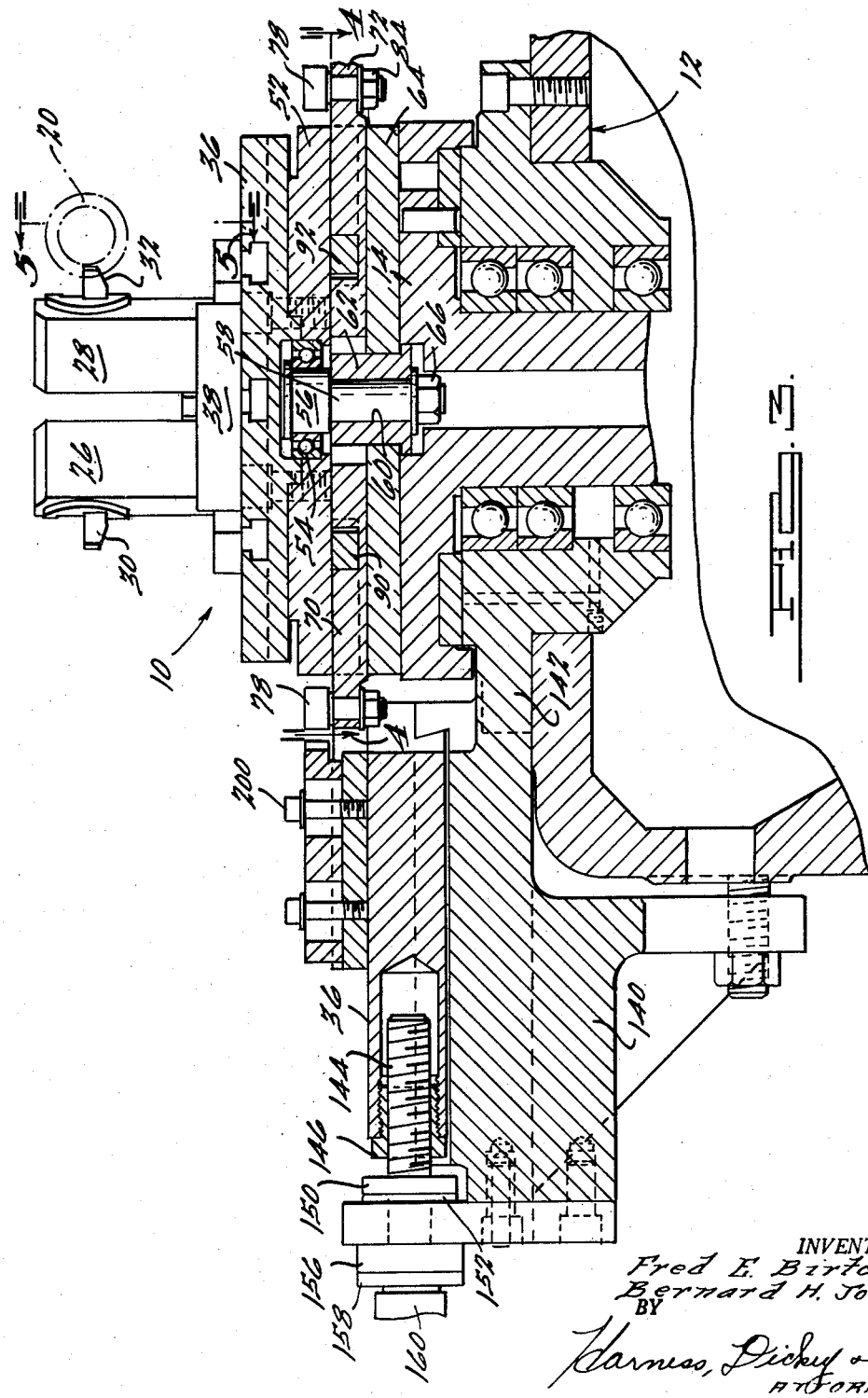

United States Patent Office 2,859,665
Patented Nov. 11, 1958

2,859,665

APPARATUS FOR RELIEVING PORTIONS OF THE THREAD FLANKS OF DOUBLE ENVELOPING WORM ELEMENTS

Fred E. Birtch, Bloomfield Township, Oakland County, and Bernard H. Johnson, Traverse City, Mich., assignors to Michigan Tool Company, Detroit, Mich., a corporation of Delaware Application December 21, 1956, Serial No. 629,966

4 Claims. (Cl. 90—3)

This invention relates to double enveloping or Cone drive type worm elements and, more particularly, to improved apparatus for relieving portions of the thread flanks of double enveloping worm elements.

Double enveloping worm elements of the indicated character are characterized in that, in the mid-plane of the worm element, the helical thread form is straight sided or rectilinear, and lines drawn in the mid-plane as extensions of the helical thread flanks all lie tangent to a common circle. This circle is conventionally known as the base circle of the worm wheel, and the axis of the base circle coincides with the axis of the worm wheel which is of mating capacity with the worm element when the worm wheel is positioned at the correct center distance from the worm element. In addition, in double enveloping or Cone drive type worm elements, the helix or thread angle of the worm element changes continuously at any one radius point and along the entire enveloping thread contour, i. e., there is a continual change of the thread angle at the pitch line of the worm threads throughout the entire thread length. Furthermore, in a radial plane, there is a differential of helix between the bisecting point at the tip of the worm thread and the bisecting point at the root of the worm thread, and this last-mentioned differential is not the same as the tip root helix differential in a radial plane at other locations from the center of the thread to either end of the thread. Smooth and quiet operation of worm gearing of this type are essential in most applications. Furthermore, in practically all designs of the type of gearing herein described, multiple tooth engagement is embodied in the gearing. As a result, in each convolution of each thread of the worm, one or more teeth are simultaneously under load while the entering end of the thread is about to engage an additional tooth. When any appreciable load is transmitted, the teeth already in engagement are always under deflection or compression as a result of the load being transmitted. However, the tooth on the worm wheel which is about to receive its proportion of the load is not subject to such deflection or compression. In order to obtain smooth and quiet operation so that the entry of the worm thread between the teeth of the wheel and its departure therefrom will be smooth, it has been found desirable to relieve the flanks of the worm thread adjacent the ends thereof so that the loads may be transmitted to the engaged tooth gradually and smoothly.

In order that a complete understanding may be had of the general type of gearing to which the present invention relates, reference may be had to Cone Patents Nos. 1,885,686 and 1,822,800 together with Scott Patent No. 2,279,414.

From reference to the above-mentioned patents, it will be seen that in double enveloping or Cone drive type worm elements, it has been found that due to a certain limited inherent resiliency in the materials from which the worm and the wheel are formed, both the entering and leaving ends of the thread flanks of the worm should be slightly and gradually relieved in order to obtain a smooth, full bearing between the worm and worm wheel when operating under conditions of reasonable load.

An object of the present invention is to provide improved apparatus for relieving the entering and trailing end portions of the thread flanks of double enveloping worm elements.

Another object of the invention is to provide improved apparatus which reduces the time, labor and expense of relieving portions of the thread flanks of double enveloping worm elements.

Another object of the invention is to provide improved apparatus for relieving portions of the thread flanks of double enveloping worm elements that is economical to manufacture and assemble, durable, efficient and reliable in operation.

Another object of the invention is to provide improved apparatus for relieving portions of the flanks of double enveloping worm elements which may be be installed as an accessory or which may be made a part of the original equipment of a conventional double enveloping worm generating machine.

The above as well as other objects and advantages of the present invention will become apparent from the following description, the appended claims and the accompanying drawings, wherein:

Figure 1 is a top plan view, with portions in section, of apparatus embodying the present invention, showing the same installed on a fragmentarily illustrated double enveloping worm generating machine;

Fig. 2 is a sectional view of a portion of the structure illustrated in Fig. 1, taken on the line 2—2 thereof;

Fig. 3 is a longitudinal sectional view of the structure illustrated in Fig. 1, taken on the line 3—3 thereof;

Fig. 4 is a plan view, with portions in section, taken on the line 4—4 of Fig. 3;

Fig. 5 is an enlarged elevational view of a portion of the structure illustrated in Fig. 3, taken on the line 5—5 thereof; and Fig. 6 is an enlarged plan view of a portion of the worm element illustrated in Fig. 1.

Referring to the drawings, the present invention is shown incorporated in apparatus, generally designated 10, which is particularly adapted to relieve the end portions of the thread flanks of double enveloping or Cone drive type worm elements, the apparatus 10 being shown in installed relationship with respect to a fragementarily illustrated conventional double enveloping worm element generating machine 12 that may, for example, be of the type disclosed in Patent 2,408,949, issued to H. Pelphrey, and assigned to the assignee of the present invention. For the purposes of the present invention, it is sufficient to state that the machine 12 includes a rotatable worktable 14 and head and tail stock members 16 and 18, the worm element 20 which is to be relieved being mounted between the head and tail stock members. The heads stock spindle 22 and the tail stock spindle 24 which carry the worm element 20 are disposed on an axis perpendicular to the axis of rotation of the table 14, and the worm element 20 is driven in geared timed relationship with respect to the table 14, as will be appreciated by those skilled in the art. As more fully described in the aforementioned Patent 2,408,949, means is also provided for imparting a side feed to the table 14 of such generating machine by rotating the table about its axis while the correct center distance, end position and side positions of the worm element, and the geared timed relationship are maintained.

The apparatus 10 embodying the present invention includes a pair of tool holders 26 and 28 which are adapted to carry cutting tools 30 and 32 retained by set screws 34. The cutting tool 30 is designed and positioned to cut on only one side of the thread flanks while the other cutting tool 32 is designed and positioned to cut the opposite side of the thread flanks. The tool holders 26 and 28 are clamped in their respective positions on a slotted plate 36 through the agency of clamping elements 38 and 40 which carry set screws 42 that are adapted to engage shoulder portions 44 provided on the tool holders 26 and 28. The clamping elements 38 and 40 are retained by nuts 46 which threadedly engage T bolts 48, the head portions of which are disposed in slots, such as 50, provided in the plate 36. The plate 36 is in turn fixed to an oscillating base 52 which is supported radially by a ball bearing 54 mounted on a pilot stud 56. The pilot stud includes a shank portion 58 which is mounted in the bore 60 of a bushing 62 carried by a support member 64 and retained by a nut 66. The support member 64 is rigidly secured to the rotatable work table 14 of the machine 12, as by screws 68.

In order to provide the minor and major relief of the worm threads, as disclosed and claimed in the aforementioned Scott Patent 2,279,414, the rotary motion of the cutting tools 30 and 32 is advanced or retarded as the tools 30 and 32 pass through either end portion of the worm threads while the work table 14 supporting the cutting means and the worm 20 being relieved are rotating at the required timed relationship. Each tool 30 and 32 will then complete its required oscillating cycle in each rotation of the work table.

In order to advance and retard the cutting means while the work table 14 is rotating, a pair of plunger members 70 and 72 are provided each having a head portion 74 and a shank portion 76. The head portion 74 of each plunger member carries an adjustable cam follower 78 having a shank portion 80 which projects through an arcuate slot 82 defined by the head portion and which is retained by a nut 84. The shank portions 76 of the plunger members 70 and 72 are mounted in aligned radially extending grooves 86 and 88 provided in the support member 64. A pair of rocker arms 90 and 92 are provided which are pivotally connected to the support member 64 by pivot pins 94 and 96, the rocker arms being disposed in enlarged recesses 98 and 100 provided in the support member 64 so that the upper surfaces 102 of the rocker arms 90 and 92 are substantially coplanar with the upper surface 104 of the support member 64.

Each of the plunger members 70 and 72 is provided with a transversely extending recess 106 which is preferably of the shape shown in Fig. 4, and one end portion of each rocker arm is disposed in the recess 106 of the associated plunger member so that the apices of the generally triangularly shaped portions 108 and 110 of the plunger members make substantially line contact with the rocker arms. The other end portions of the rocker arms 90 and 92 are bifurcated and define generally rectangular slots 112 and 114 adapted to receive bushings 116 and 118. The bushings, in turn, are fixed to dowel pins 120 and 122, respectively, and the opposite end portions of the dowel pins 120 and 122 are fixed to the oscillating base 52. With such a construction, the radially inward movement of the plunger member 70 will cause the rocker arm 90 to pivot in a counter clockwise direction about the longitudinal axis of the dowel pin 94. Pivotal movement of the rocker arm 90 forces the dowel pin 120 and bushing 116 in a generally counter clockwise direction, as viewed in Fig. 4, and since the dowel pin 120 is anchored to the oscillating base 52, the oscillating base 52 and the cutting means carried thereby will also move in a counter clockwise direction about the longitudinal axis of the pilot stud 58. The radially inward movement of the other plunger member 72 will cause the rocker arm 92 to pivot in a clockwise direction about the longitudinal axis of the pivot pin 96. The pivotal movement of the rocker arm 92 thus forces the dowel pin 122 and bushing 118 in a clockwise direction, as viewed in Fig. 4, and since the dowel pin 122 is also anchored to the oscillating base 52, the oscillating base 52 and the cutting means carried thereby will also move in a clockwise direction about the longitudinal axis of the pilot stud 58.

As previously mentioned, each cutting tool is designed and positioned to cut on only one side of the thread flank, it being preferred to utilize a pair of cutting tools so that the opposite sides of the thread flanks will be cut by the two tools during the same rotational cycle of the rotating work table 14 of the machine.

The velocity of the oscillating motion of the cutting means is controlled by a pair of adjustable contour cams 124 and 126, each of which is individually adjustable to provide the desired velocity of oscillation of the cutting means for both the top side and the bottom side of the thread flanks for a particular end of the worm thread. The cams 124 and 126 are pivotally connected to a plate 128, as shown in Fig. 1, by pivot pins 130 and 132 which are anchored in the plate 128. The cams 124 and 126 are fixed in the desired angularly adjusted positions through the agency of cap screws 134 which project through arcuate slots provided in the cams 124 and 126, the cap screws being retained by tapped holes in the plate 128. The plate 128 is fixed to a slide member 136 which, in turn, is mounted on dovetail ways 138 provided on a bracket 140 which is fixed to the stationary base 142 of the machine 12.

In order to facilitate moving the slide member 136 on the ways 138, a feed screw 144 is provided which threadably engages a nut 146 fixed to the slide member 136. The feed screw 144 projects through an end support plate 148 fixed to the bracket 140, longitudinal movement of the feed screw 144 being prevented by an enlarged collar portion 150 provided on the feed screw which bears against a thrust washer 152 engaging one side of the support plate 148 and a sleeve 154 bearing against the other side of the plate 148. If desired, a graduated dial 156 may be secured to the sleeve by a nut 158. A hand wheel 160 is provided which is keyed to the outer end portion of the feed screw 144, the assembly being retained by a nut 162. In lieu of the hand wheel, a motor and suitable change gears and limit switches may be substituted to provide an automatic infeed for the cam.

With such a construction, rotation of the hand wheel 160 in one direction serves to advance the slide member 136 and the cams 124 and 126 carried thereby radially inwardly toward the longitudinal axis of the pilot stud 58 and rotation of the hand wheel 160 in the opposite direction serves to retract the slide member 136 and cams 124 and 126 radially outwardly from the longitudinal axis of the pilot stud 58.

The rocker arms 90 and 92 which are controlled, respectively, by the plunger members 70 and 72, advance or retard the oscillating base 52 in the direction of the arrows shown on the plunger members. As the plunger member 70 with the associated cam follower 78 passes over the cam surfaces 164 and 166 of the cams 124 and 126 while the support member 64 is rotating with the rotatable work table 14, the plunger member 70 is moved radially inwardly by the cam surfaces 164 and 166 thereby causing the rocker arm 90 to oscillate the cutting tool 32 to relieve one side of the thread. As the other plunger member 72 with the associated cam follower passes over the cam surfaces 164 and 166 of the cams 124 and 126 while the support member 64 is rotating with the rotatable work table 14, the plunger member 72 is moved radially inwardly by the cam surfaces thereby causing the other rocker arm 92 to oscillate the cutting tool 30 to relieve the other side of the worm thread.

In order to return the oscillating base 52 and the cutting means to the center position at the velocity of cam relief as the inward force on the plunger members is released, a pair of equalizer pins 168 and 170 are provided which are mounted in passageways 172 and 174 provided in the support member 64. The equalizer pins are mounted in opposed relationship with respect to each other and bear against spaced substantially flat surfaces 176 and 178 provided on a pin 180, as shown in Figs. 2 and 4. One end of the pin 180 projects into a recess 182 provided in the support member 64 while the opposite end of the pin 180 is fixed to the oscillating base 52. The equalizer pins 168 and 170 each include a shank portion 184, the inner end of which bears against the pin 180, and an enlarged collar portion 186. The collar portion of the pin 168 is adapted to bear against a counterbored face 188 provided in the support member 64 while the collar portion of the pin 170 is adapted to bear against a counterbored face 190 provided in the supporting member 64. Each of the equalizer pins 168 and 170 is biased toward the pin 180 by a coil spring 192 retained by an adjustment screw 194 which threadably engages the support member.

The equalizer 168 and 170 serve to return the oscillating base 52 and the cutting means to the center position from either direction of oscillation, and when the oscillating base has returned to the center position, the collar portion 186 of each equalizer pin will bear against the associated counterbored face 188 or 190 to prevent the oscillating base from overrunning the center position when returning to center.

Referring to Figs. 1 and 6, the double enveloping worm 20 is shown in plan view. The cutting tool 32 for relieving the left side of the worm thread is shown in position in the thread space at the center of the worm. The cam follower 78 carried by the plunger member 70 which functions to effect oscillation of the tool 32 to the left is located between the two cams 124 and 126 in Fig. 1. It is preferred that the cutting means for either flank of the worm thread be located directly opposite the cam follower associated therewith, and the elongated arcuate slot 82 provided in the head portion 74 of each plunger member facilitates such adjustment. With the work spindles 22 and 24 and the rotatable work table 14 geared to the required ratio relationship, and with the table 14 rotated so that the center line of one of the worm thread spaces is at the center of the worm at the cutting plane height as illustrated, the corresponding cam follower 78 can be adjusted in the arcuate slot 82 of the associated plunger member so as to maintain the directly opposite location from the cutting means. Each cam follower is then locked in this selected adjusted position.

In order to facilitate locating the cam followers, a centering head 196 is provided having a V slot 198 at the inner end thereof, the apex of the V slot being disposed on the center line of the pilot stud 58. The centering head 196 is fixed to the plate 128, as by screws 200 which project through elongate slots 202 in the centering head and threadably engage the plate 128. Thus, with the cutting means located at the center of the worm, the centering head 196 may be utilized to establish the center line location for the corresponding cam follower.

While a preferred embodiment of the invention has been shown and described, it will be understood that various changes and modifications may be made without departing from the spirit of the invention.

What is claimed is:

1. Apparatus for relieving the thread flanks of double enveloping worm elements including, in combination, a rotatable support member, a base mounted for pivotal movement relative to said support member, a pair of plunger members carried by said support member and movable in a radial direction relative to the axis of rotation of said support member, a pair of rocker arms pivotally connected to said support member and actuable by said plunger members, means connecting said rocker arms to said base and actuable to effect angular movement of said base from a predetermined position relative to said support member, and means carried by said support member for returning said base to said predetermined position.

2. Apparatus for relieving the thread flanks of double enveloping worm elements including, in combination, a rotatable support member, a base mounted for angular movement relative to said support member, a pair of actuating members carried by said support member and movable in a radial direction relative to the axis of rotation of said support member, a pair of rocker arms pivotally connected to said support member and actuable by said actuating members, means connecting said rocker arms to said base and actuable to effect angular movement of said base from a predetermined position relative to said support member, cam means for effecting radial movement of said actuating members, and means carried by said support member for returning said base to said predetermined position.

3. Apparatus for relieving the thread flanks of double enveloping worm elements including, in combination, a rotatable support member, a base mounted for angular movement relative to said support member, a pair of cutting elements carried by said base, a pair of actuating members carried by said support member and movable in a radial direction relative to the axis of rotation of said support member, a pair of rocker arms pivotally connected to said support member and actuable by said actuating members, means connecting said rocker arms to said base and actuable to effect angular movement of said base in opposite directions from a predetermined angular position relative to said support member, cam means for effecting radial movement of said actuating members, and means carried by said support member for returning said base to said predetermined angular position.

4. Apparatus for relieving the end portions of the thread flanks of double enveloping worm elements including, in combination, a rotatable support member, a base mounted for angular movement relative to said support member, a pair of cutting elements carried by said base, a pair of plunger members carried by said support member and movable in a radial direction relative to the axis of rotation of said support member, a pair of rocker arms pivotally connected to said support member and actuable by said plunger members upon radial movement thereof, means connecting said rocker arms to said base and actuable to effect angular movement of said base in opposite directions from a predetermined position relative to said support member, a pair of cam elements engageable by said plunger members and effective to move said plunger members in said radial direction, and means including opposed spring means carried by said support member for returning said base to said predetermined position.

References Cited in the file of this patent

UNITED STATES PATENTS

| | | |
|---|---|---|
| 2,348,845 | Pelphrey | May 16, 1944 |
| 2,408,949 | Pelphrey | Oct. 8, 1946 |
| 2,756,641 | Skog | July 31, 1956 |